US012600601B2

(12) United States Patent
Li et al.

(10) Patent No.: US 12,600,601 B2
(45) Date of Patent: Apr. 14, 2026

(54) VOLTAGE SIGNAL PROCESSING UNIT, LANDING DOOR FAILURE LOCATING SYSTEM AND METHOD, ELEVATOR SYSTEM

(71) Applicant: Otis Elevator Company, Farmington, CT (US)

(72) Inventors: Bichun Li, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1193 days.

(21) Appl. No.: 17/520,327

(22) Filed: Nov. 5, 2021

(65) Prior Publication Data

US 2022/0219943 A1 Jul. 14, 2022

(30) Foreign Application Priority Data

Jan. 13, 2021 (CN) .......................... 202110041889.8

(51) Int. Cl.
*B66B 13/22* (2006.01)
*H02J 13/00* (2006.01)
(52) U.S. Cl.
CPC ........ *B66B 13/22* (2013.01); *H02J 13/00006* (2020.01); *H02J 13/0004* (2020.01)
(58) Field of Classification Search
CPC ..... B66B 13/22; B66B 5/0031; B66B 5/0087; B66B 13/14; B66B 5/02; H02J 13/00006; H02J 13/0004
See application file for complete search history.

(56) References Cited

U.S. PATENT DOCUMENTS 3,961,688 A * 6/1976 Maynard ................... B66B 5/02
187/289
3,974,426 A * 8/1976 Gingras ................. G05B 11/32
327/512
(Continued)

FOREIGN PATENT DOCUMENTS

CN 1487901 A 4/2004
CN 203845610 U 9/2014
(Continued)

OTHER PUBLICATIONS

English machine translation of Abstract, Claims, and Description of CN 211687833 U (Year: 2025).*

(Continued)

*Primary Examiner* — Pedro J Cuevas
(74) *Attorney, Agent, or Firm* — CANTOR COLBURN LLP

(57) ABSTRACT

A voltage signal processing unit, a landing door fault location system and method, and an elevator system. The voltage signal processing unit includes: a first voltage signal input port; a second voltage signal input port; a first electrical level signal output port; a first voltage signal collection circuit, the first voltage signal collection circuit terminates with the first voltage signal input port and the first electrical level signal output port, the first voltage signal collection circuit is adapted to collect a first voltage signal received from the first voltage signal input port as a first electrical level signal output from the first electrical level signal output port; and a voltage signal bridge circuit, the voltage signal bridge circuit terminates with the first voltage signal input port and the second voltage signal input port, a normally open relay switch is provided.

20 Claims, 2 Drawing Sheets

(56) References Cited

U.S. PATENT DOCUMENTS

| | | | | | |
|---|---|---|---|---|---|
| 4,236,084 | A | * | 11/1980 | Gingras | G05B 11/32 |
| | | | | | 236/47 |
| 4,785,914 | A | * | 11/1988 | Blain | B66B 5/02 |
| | | | | | 187/280 |
| 5,744,936 | A | * | 4/1998 | Kawakami | H02J 7/0024 |
| | | | | | 320/120 |
| 5,982,052 | A | * | 11/1999 | Sosnowski | H02J 13/00009 |
| | | | | | 700/297 |
| 9,365,394 | B2 | * | 6/2016 | Rees | B66B 5/0087 |
| 10,899,579 | B2 | * | 1/2021 | Nakari | B66B 1/32 |
| 2014/0117777 | A1 | * | 5/2014 | Rees | B66B 5/0087 |
| | | | | | 307/115 |
| 2018/0093855 | A1 | * | 4/2018 | Nakari | B66B 5/02 |

FOREIGN PATENT DOCUMENTS

| | | | | | |
|---|---|---|---|---|---|
| CN | 106586754 | A | | 4/2017 | |
| CN | 211687833 | U | | 10/2020 | |
| CN | 112152212 | A | * | 12/2020 | H02J 3/00 |
| JP | 2007223730 | A | | 9/2007 | |
| JP | 2012254845 | A | | 12/2012 | |
| WO | 02057173 | A1 | | 7/2002 | |

OTHER PUBLICATIONS

Machine translation of CN 112152212 A (Year: 2025).*
European Search Report for Application No. 21212960.5; Issued May 18, 2022, 8 Pages.
Chinese Office Action for Application No. 202110041889.8, Issued Jun. 19, 2025, 10 Pages.

* cited by examiner

VOLTAGE SIGNAL PROCESSING UNIT, LANDING DOOR FAILURE LOCATING SYSTEM AND METHOD, ELEVATOR SYSTEM

FOREIGN PRIORITY

This application claims priority to Chinese Patent Application No. 202110041889.8, filed Jan. 13, 2021, and all the benefits accruing therefrom under 35 U.S.C. § 119, the contents of which in its entirety are herein incorporated by reference

TECHNICAL FIELD

The present disclosure relates to the field of elevators; specifically, the present invention relates to a voltage signal processing unit, a landing door fault location system and method, and an elevator system.

BACKGROUND

As an important component to ensure the safe operation of the elevator system, the landing door safety circuit is arranged in the elevator system in accordance with the corresponding industry standards. If a landing door lock fault occurs at a certain floor, such as the landing door is not closed in place, the mechanical lock hook is not in place, etc., the landing door lock fault will cause the entire landing door safety circuit to fail, and the elevator system control board will control the elevator car to stop running according to the fault of the landing door safety circuit, avoiding the operation of the elevator system under unsafe conditions.

SUMMARY

An object of one aspect of the present invention is to provide an improved voltage signal processing unit.

An object of another aspect of the present invention is to provide an improved landing door fault location system.

An object of another aspect of the present invention is to provide an improved landing door fault location method.

An object of another aspect the present invention is to provide an improved elevator system.

In order to achieve the foregoing objective, one aspect of the present invention provides a voltage signal processing unit, wherein the voltage signal processing unit comprises: a first voltage signal input port; a second voltage signal input port; a first electrical level signal output port; a first voltage signal collection circuit, the first voltage signal collection circuit terminates with the first voltage signal input port and the first electrical level signal output port, the first voltage signal collection circuit is adapted to collect a first voltage signal received from the first voltage signal input port as a first electrical level signal output from the first electrical level signal output port; and a voltage signal bridge circuit, the voltage signal bridge circuit terminates with the first voltage signal input port and the second voltage signal input port, a normally open relay switch is provided between the first voltage signal input port and the second voltage signal input port.

Optionally, in the voltage signal processing unit as described above, the number of the relay switch is more than one, and each relay switch is connected in series.

Optionally, in the voltage signal processing unit as described above, a current limiting resistor connected in series with the relay switch is provided in the voltage signal bridge circuit.

Optionally, in the voltage signal processing unit as described above, a fuse connected in series with the current limiting resistor is provided in the voltage signal bridge circuit.

Optionally, in the voltage signal processing unit as described above, the voltage signal processing unit is further provided with a control port for independently controlling each of the relay switches.

Optionally, in the voltage signal processing unit as described above, the first voltage signal collection circuit comprises a first isolation device, the first isolation device isolates the first voltage signal collection circuit into an input side circuit connecting the first voltage signal input port and an output side circuit connecting the first electrical level signal output port.

Optionally, in the voltage signal processing unit as described above, the input side circuit comprises a divider resistor and a rectifier bridge connected in series, the rectifier bridge is connected to the first isolation device.

Optionally, in the voltage signal processing unit as described above, the voltage signal processing unit further comprises: a second electrical level signal output port; and a second voltage signal collection circuit, the second voltage signal collection circuit connects the second voltage signal input port and the second electrical level signal output port, the second voltage signal collection circuit is adapted to collect a second voltage signal received from the second voltage signal input port as a second electrical level signal output from the second electrical level signal output port.

Optionally, in the voltage signal processing unit as described above, the second voltage signal collection circuit comprises a second isolation device, the second isolation device isolates the second voltage signal collection circuit into an input side circuit connecting the second voltage signal input port and an output side circuit connecting the second electrical level signal output port.

Optionally, in the voltage signal processing unit as described above, the input side circuit comprises a divider resistor and a rectifier bridge connected in series, the rectifier bridge is connected to the second isolation device.

Optionally, in the voltage signal processing unit as described above, the voltage signal processing unit is provided with a power source interface, a peripheral human-machine interface and/or an output display interface.

Optionally, in the voltage signal processing unit as described above, the voltage signal processing unit further comprises a logic control module, and the electrical level signal output port on the voltage signal processing unit and/or the control port communicates with the logic control module in a wired or wireless manner.

Optionally, in the voltage signal processing unit as described above, the voltage signal processing unit is further provided with a wireless communication module adapted to input and/or output communication data from the logic control module.

In order to achieve the foregoing objects, another aspect of the present invention provides a landing door fault location system for an elevator system, characterized in that the landing door fault location system comprises a landing door safety circuit, the landing door safety circuit comprises multiple sets of landing door switch assemblies connected in series, and each set of the landing door switch assemblies is set corresponding to a landing station of the elevator system, wherein, each set of the landing door switch assemblies is connected in parallel with the voltage signal processing unit according to any one of the foregoing aspects, and the first voltage signal input port and the second voltage signal input port of the voltage signal processing unit electrically connect an output end and an input end of the corresponding landing door switch assembly respectively.

Optionally, in the landing door fault location system as described above, the landing door switch assembly comprises a door close in place switch and a door lock in place switch connected in series, and the door close in place switch and the door lock in place switch is a normally closed switch.

Optionally, in the landing door fault location system as described above, the landing door fault location system comprises a logic control module located in an external panel of each floor of the elevator system, and the electrical level signal output port on the voltage signal processing unit and/or the control port communicates with the logic control module in a wired or wireless manner.

Optionally, in the landing door fault location system as described above, the external panel is further provided with a wireless communication module adapted to input and/or output communication data from the logic control module.

In order to achieve the foregoing objects, another aspect of the present invention provides a landing door fault location method using the landing door fault system according to any one of the foregoing another aspect.

Optionally, in the landing door fault location method as described above, the landing door switch assembly is connected in parallel to the voltage signal processing unit according to any one of the foregoing one aspect, the method comprises following steps: step A1: set n=the total number of floors of elevator travel, and then proceed to step B1; step B1: the logic control module detects the first electrical level signal of the nth floor, if it is detected that the first electrical level signal of the nth floor is ON, then reports the normality of the landing door switch of the nth floor to an elevator system control board, and then proceed to step C1, if it is detected that the first electrical level signal of the nth floor is OFF, then reports the fault of the landing door switch of the nth floor to the elevator system control board and turns on the relay switches of all the floors where the fault has been determined, and then proceed to step C1; step C1: detects the first electrical level signal of the n−1th floor, if it is detected that the first electrical level signal of the n−1th floor is ON, then reports the normality of the landing door switch of the n−1th floor to the elevator system control board, and then proceed to step F1, if it is detected that the first electrical level signal of the n−1th floor is OFF, then proceed to step D1; step D1: the logic control module queries from the elevator system control board whether there is a safety loop voltage signal at the nth floor, If yes, then reports the fault of the landing door switch of the n−1th floor to the elevator system control board, and then proceed to step E1, otherwise the event is stored and the elevator is shut down; step E1: turn on the relay switches of all floors where the fault has been determined, and proceed to step F1; step F1: judge whether n−1 is equal to 1, if yes, then proceed to step H1, otherwise proceed to step G1; step G1: set n=n−1 and return to step C1; step H1: end.

Optionally, in the landing door fault location method as described above, the landing door switch assembly is connected in parallel to the voltage signal processing unit according to any one of the foregoing one aspect, the method comprises following steps: step A2: set n=the total number of floors of elevator travel, and then proceed to step B2; step B2: the logic control module detects the first electrical level signal and the second electrical level signal of the nth floor, if it is detected that the first electrical level signal of the nth floor is ON and the second electrical level signal of the nth floor is ON, then reports the normality of the landing door switch of the nth floor to an elevator system control board, and then proceed to step D2, if it is detected that the first electrical level signal of the nth floor is OFF and the second electrical level signal of the nth floor is ON, then reports the fault of the landing door switch of the nth floor to the elevator system control board and turns on the relay switches of all the floors where the fault has been determined, and then proceed to step C2; step C2: turn on the relay switches of all floors where the fault has been determined, and proceed to step D2; step D2: judge whether n is equal to 1, if yes, then proceed to step F2, otherwise proceed to step E2; step E2: set n=n−1 and return to step B2; step F2: end.

In order to achieve the foregoing objects, another aspect of the present invention provides an elevator system, the elevator system comprising the voltage signal processing unit according to any one of the foregoing one aspect or the landing door fault location system according to any one of the foregoing another aspect.

DESCRIPTION OF THE DRAWINGS

With reference to the drawings, the disclosure of the present invention will be more apparent. It should be understood that these drawings are only for illustrative purposes and are not intended to limit the scope of protection of the present invention. In the drawings.

DETAILED DESCRIPTION

Figure 1:
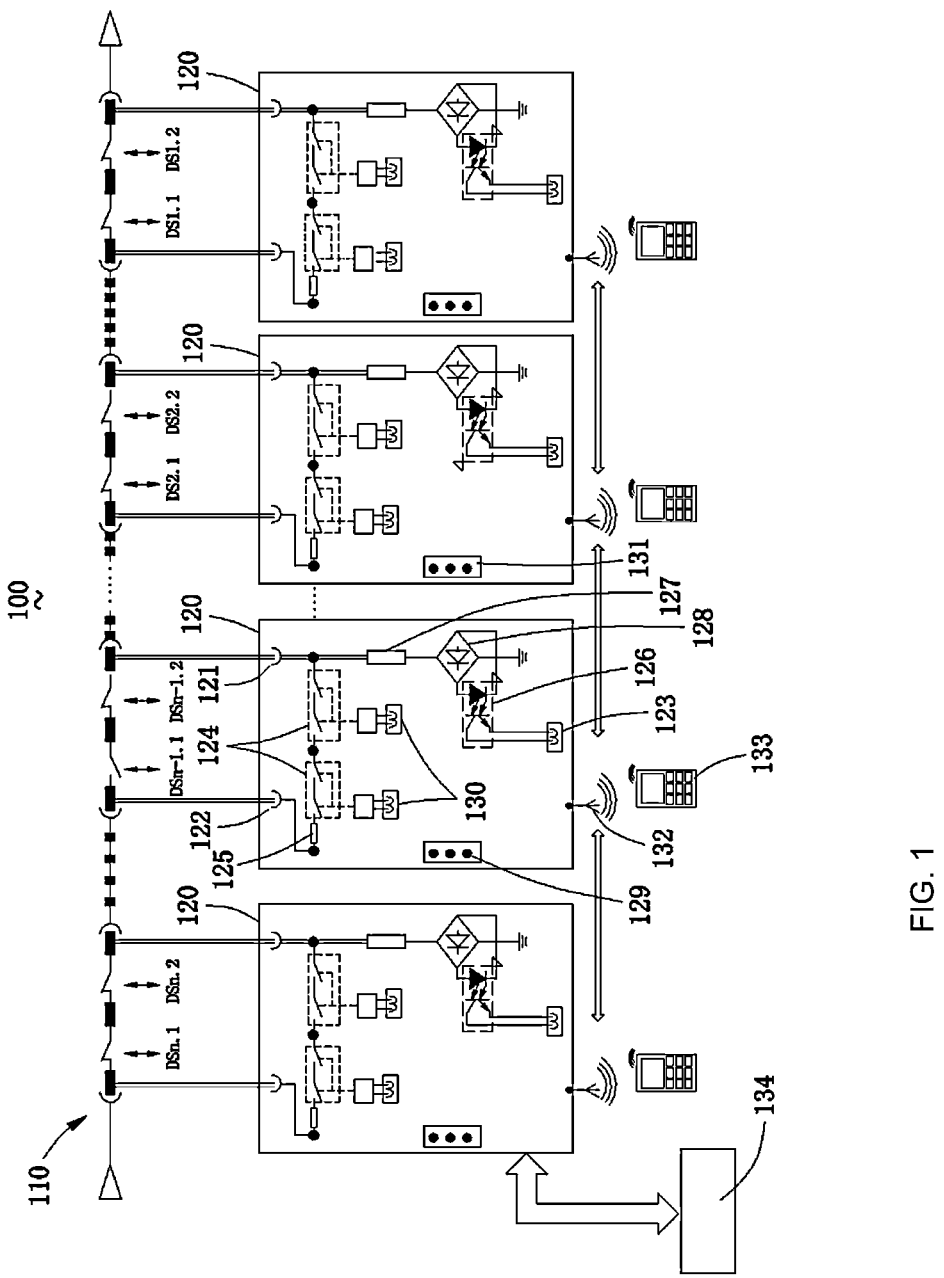
FIG. 1 is a schematic diagram of a landing door fault location system according to an embodiment of the present invention.

The specific embodiments of the present invention will be described in detail below with reference to the accompanying drawings. In the drawings, the same reference numerals indicate the same or corresponding technical features.

For brevity and illustrative purposes, the specification describes the principles of the present invention with reference to the examples in the accompanying drawings. However, those skilled in the art should understand that the same principles can be equivalently applied to various voltage signal processing units, landing door fault location systems and methods, elevator systems of various types of elevator systems, and these same principles can be implemented therein, and any such changes do not depart from the true spirit and scope of the application.

The "first", "second" or similar expressions mentioned in the specification are only used for purposes of naming, describing or distinguishing, and should not understood as indicating or implying the relative importance of the corresponding members, nor necessarily limiting the number of corresponding members.

Moreover, in the following description, reference is made to the accompanying drawings, which illustrate specific exemplary embodiments, which can be modified electrically, mechanically, logically and structurally without departing from the spirit and scope of the present invention. In addition, although features of the present invention are disclosed in combination with only one of or more of several embodiments/examples, if it may be desired and/or advantageous for any given or identifiable function, this feature can be combined with one or more other features of other embodiments/examples. Therefore, the following description should not be considered in a limiting sense, and the scope of the present invention is defined by the appended claims and their equivalents.

Figure 2:
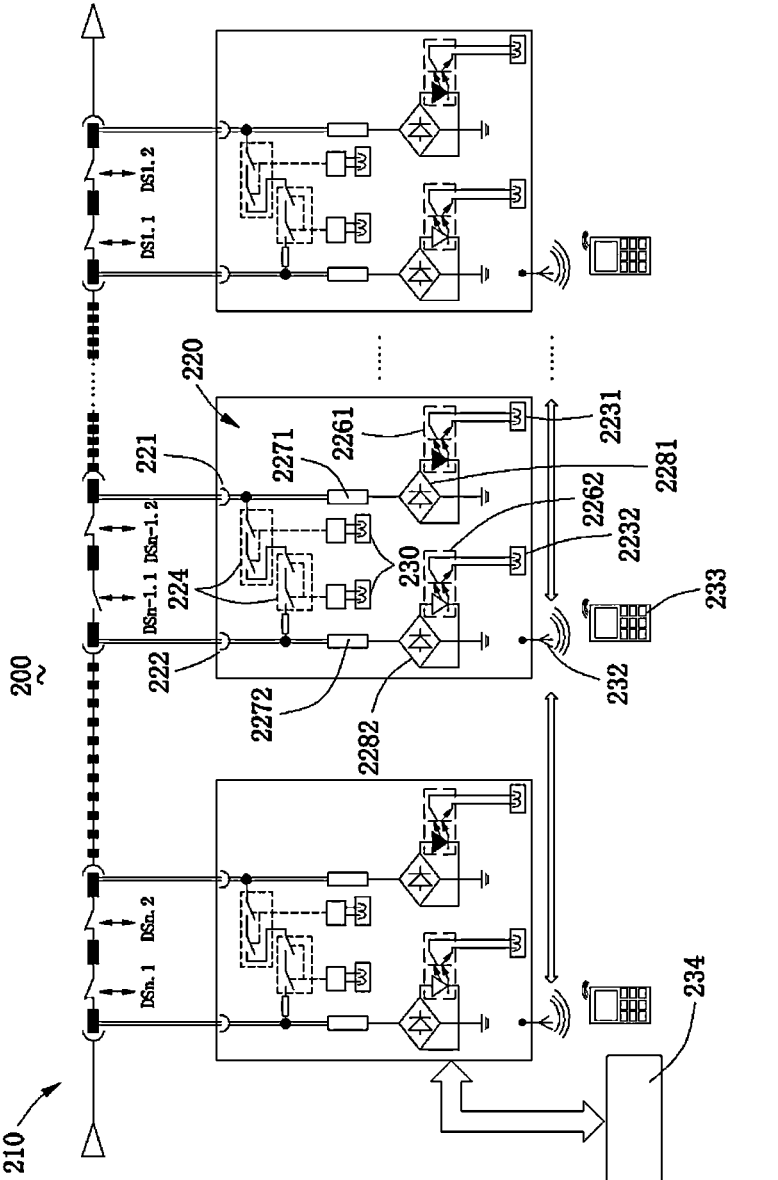
FIG. 2 is a schematic diagram of a landing door fault location system according to another embodiment of the present invention.

FIGS. 1 and 2 respectively show landing door fault location systems 100 and 200 according to different embodiments of the present invention.

These landing door fault location systems 100 and 200 are suitable for elevator systems (not shown). This kind of elevator system is an elevator system, which comprises the apparatus in the elevator shaft (such as but not limited to the car, counterweight, etc., which will not be repeated here) and the apparatus at the landing station of the building (landing doors, hall call control panels, etc., which will not be repeated here).

The landing door fault location systems 100 and 200 respectively have landing door safety circuits 110 and 210 and a plurality of voltage signal processing units 120 and 220. The landing door safety circuits 110 and 210 respectively have landing door switch assemblies for indicating landing door faults at each landing station, and the respective voltage signal processing units 120 and 220 are respectively connected in parallel with respective landing door switch assemblies.

During the normal running of the elevator, the door close in place switch and the door lock in place switch in each landing door switch assembly are closed. Once the landing door fault occurs, at least one of the door close in place switch and the door lock in place switch cannot be closed, causing the elevator not to continue to run, at this time, the maintenance personnel cannot judge which landing door of the landing station of the elevator system has failed.

Therefore, when the landing door at each landing station of the elevator system has a locking fault, each voltage signal processing unit can locate the failed landing door by detecting the status of the landing door switch assembly in the landing door safety circuit, and send the results of related detection and location to the information storage system in a wired or wireless manner for the system to use as a control parameter or for a maintenance personnel to read and use. The information storage system can be provided at the elevator system control board or in mobile terminal apparatus, for example special maintenance tools such as mobile phones and diagnostic equipment and so on.

The following describes the specific embodiments of the corresponding landing door fault location system with reference to FIG. 1 and FIG. 2.

FIG. 1 is a schematic diagram of a landing door fault location system according to an embodiment of the present invention. As mentioned earlier, this landing door fault location system is suitable for elevator systems. As can be seen from FIG. 1, the landing door fault location system 100 comprises a landing door safety circuit 110 and a voltage signal processing unit 120.

First, the following describes in detail the landing door safety circuit 110 shown in the figure.

In this embodiment, the landing door safety circuit 110 comprises multiple sets of landing door switch assemblies DSn.1 and DSn.2, DSn−1.1 and DSn−1.2, DSn−2.1 and DSn−2.2 . . . DS1.1 and DS1.2 connected in series, where DSn.1 and DSn.2 constitute a set of landing door switch assemblies; DSn−1.1 and DSn−1.2 constitute a set of landing door switch assemblies; DSn−2.1 and DSn−2.2 constitute a set of landing doors switch assemblies; . . . ; DS1.1 and DS1.2 constitute a set of landing door switch assemblies. Wherein, n represents the total number of floors in the elevator system, and "0.1" and "0.2" respectively represent the first switch and the second switch in each set of landing door switch assemblies. The first switch and the second switch in each set of landing door switches are also connected in series with each other.

Each set of landing door switch assemblies is set corresponding to a landing station of the elevator system. For example, the landing door switch assemblies DSn.1 and DSn.2 are set corresponding to the landing station of the nth floor of the elevator system; the landing door switch assemblies DSn−1.1 and DSn−1.2 are set corresponding to the landing station of the n−1th floor of the elevator system; the landing door switch assemblies DSn−2.1 and DSn−2.2 are set corresponding to the landing station of the n−2th floor of the elevator system; . . . ; the landing door switch assemblies DS1.1 and DS1.2 are set corresponding to the landing station of the first floor of the elevator system.

In this example, the first switch may be a door close in place switch of the corresponding landing door, and the second switch may be a door lock in place switch of the corresponding landing door. If a certain landing door fails to close in place and/or the mechanical lock hook is not in place at a certain landing station, the door close in place switch and the door lock in place switch of the corresponding landing door will be turned off, and thus the entire landing door safety circuit will fail, the elevator system control board will control the elevator car to stop running according to the fault of the landing door safety circuit to avoid the elevator system running under unsafe conditions and at the same time issue maintenance requests. In alternative embodiments, according to the number of safety parameters involved in specific situations, the setting of other numbers and other types of landing door switch assemblies can also be considered so as to be disconnected to realize the safety protection function when different faults occur to landing door.

As shown in the figure, each set of landing door switch assemblies DSn.1 and DSn.2, DSn−1.1 and DSn−1.2, DSn−2.1 and DSn−2.2 . . . DS1.1 and DS1.2 are all connected in parallel with a voltage signal processing unit 120, and the first voltage signal input port 121 and the second voltage signal input port 122 of each voltage signal processing unit 120 are respectively electrically connected to the output end and the input end of the corresponding landing door switch assemblies.

Secondly, the voltage signal processing unit 120 in the figure is described in detail below. The voltage signal processing unit 120 may be a floor control board of an elevator system. In this example, it may be integrated with a landing door fault detection function.

As can be seen from the figure, each voltage signal processing unit 120 comprises a first voltage signal input port 121, a second voltage signal input port 122 and a first electrical level signal output port 123. As shown in the figure, in the landing door fault location system 100, the first voltage signal input port 121 is connected to the output end of the landing door switch assembly of the corresponding landing station, and the second voltage signal input port 122 is connected to the input end of the landing door switch assembly of the corresponding landing door. By taking the output end and the input end of the corresponding landing door switch assembly as sampling points, the voltage signal processing unit 120 can collect the voltage signal from the output end and the input end of the landing door switch assembly, respectively.

Further, the voltage signal processing unit 120 further comprises a first voltage signal collection circuit between the first voltage signal input port 121 and the first electrical level signal output port 123. The first voltage signal collection circuit terminates with the first voltage signal input port 121 and the first electrical level signal output port 123, and the first voltage signal collection circuit is adapted to collect a first voltage signal received from the first voltage signal input port 121 as a first electrical level signal output from the first electrical level signal output port 123. By detecting the first electrical level signal, it can be used to judge whether there is a landing door fault at the corresponding landing station.

It can also be seen from FIG. 1 that the first voltage signal collection circuit comprises an optocoupler 126. The optocoupler 126 isolates the first voltage signal collection circuit into an input side circuit connecting the first voltage signal input port 121 and an output side circuit connecting the first electrical level signal output port 123. It can be seen that the input side circuit and the output side circuit are isolated and interconnected by the optocoupler 126 acting as an isolation device therebetween. Here, the optocoupler 126 plays the role of photoelectric isolation, and can be triggered by the voltage signal in the input side circuit (analog circuit) to make the output side circuit (digital circuit) output a first electrical level signal (high electrical level signal or low electrical level signal). When the input side circuit collects the voltage signal from the first voltage signal input port 121, the light emitter of the optocoupler 126 emits light, and the light receiver receives the control of the light to turn on the output side circuit, thereby outputting the first electrical level signal through the first electrical level signal output port 123.

In this embodiment, the input side circuit further comprises a divider resistor 127 and a rectifier bridge 128 connected in series, and the rectifier bridge 128 is connected to the optocoupler 126. The function of the divider resistor 127 is to take up a part of or most of the voltage to avoid excessive voltage being distributed to the optocoupler 126 and exceeding its working limit and causing damage. One end of the rectifier bridge 128 collects signals and another end is grounded, and its function is to convert AC to DC and then pass it to the light source control end of the light emitter of the optocoupler 126.

In an alternative embodiment, a relay may be used instead of the optocoupler 126 as the first isolation device. At this time, the rectifier bridge converts AC to DC, and then passes it to the coil end of the relay. When the input side circuit collects the voltage signal from the first voltage signal input port, the relay coil is energized, and the normally open contact of the relay is closed to turn on the output side circuit. The high electrical level or low electrical level signal obtained from the output side circuit can be input to the I/O port of the logic controller.

Still further, the voltage signal processing unit 120 further comprises a voltage signal bridge circuit between the first voltage signal input port 121 and the second voltage signal input port 122. The voltage signal bridge circuit terminates with a first voltage signal input port 121 and a second voltage signal input port 122, and a normally open relay switch 124 is provided between the first voltage signal input port 121 and the second voltage signal input port 122. The function of the relay switch 124 here is to close the relay switch 124 in the voltage signal bridge circuit of the voltage signal processing unit 120 at the corresponding landing station when there is a landing door fault in the corresponding landing station, enabling the voltage signal of the landing door safety circuit to be transmitted to the landing door switch assembly and the voltage signal processing unit at the next landing station, so as to facilitate the detection of the landing door fault at the next landing station. It can be understood that when there is a landing door fault at a certain landing station, the switch in the landing door switch assembly will be disconnected, which will cause the landing door safety circuit to be disconnected at that floor; at this time, the voltage signal bridge circuit will bridge the voltage signal of the last floor to the next floor.

In the illustrated embodiment, for the sake of safety and reliability, in order to prevent accidental closing of the relay switch, the number of the relay switch 124 is two, and they are connected in series with each other. Accidental risks can be prevented from occurring by independently controlling the opening and closing of the two relay switches 124 through two lines. In an optional embodiment, the number of relay switches can also be set to only one or be set to more. These larger numbers of relay switches are also adapted for series connection with each other.

As shown in the figure, the voltage signal processing unit 120 is also provided with a control port 130 for controlling the relay switch. The number of the control ports 130 can be the same as the number of the relay switches 124, and the corresponding relay switches 124 are independently controlled through each control port respectively.

In addition, it can also be seen from the figure that a current limiting resistor 125 connected in series with the relay switch 124 is provided in the voltage signal bridge circuit, and the current limiting resistor 125 is located upstream of the relay switch 124. The upstream is close to the input end of the landing door switch assembly, that is, the voltage signal from the upper floor will pass through the current limiting resistor 125 before reaching the relay switch 124. In other embodiments, according to specific situations, the current limiting resistor may also be provided downstream of the relay switch. The function of the current limiting resistor 125 is to perform current limiting processing on the voltage signal bridge circuit, so that although the voltage at both ends of the circuit is basically unchanged, there is basically no power output. Therefore, the limited current cannot drive the primary contactor coil of the elevator control system to close, thereby preventing accidental startup of the elevator, but can realize the bridging of the voltage signal to continue the landing door fault detection.

Further, in an alternative embodiment, a fuse connected in series with the current limiting resistor 125 may be provided in the voltage signal bridge circuit. The fuse may be located upstream of the current limiting resistor 125. In other embodiments, according to specific situations, the fuse can also be provided downstream of the current limiting resistor. When the current limiting resistor 125 is short-circuited, the fuse melts and self-cuts the circuit, which can protect the circuit and prevent the landing door safety circuit from being accidentally bridged.

In FIG. 1, a power source interface 131 of the voltage signal processing unit is also schematically shown for supplying power to the voltage signal processing unit.

In addition, in an optional embodiment, the voltage signal processing unit may further comprise a logic control module (not shown). In this case, the first electrical level signal output port on the corresponding voltage signal processing unit and/or the control port for controlling the relay switch can communicate with the logic control module in a wired or wireless manner. During wireless communication, the voltage signal processing unit may be provided with a wireless communication module adapted to input and/or output communication data from the logic control module, such as a Bluetooth communication module.

It can be understood that, in an alternative embodiment, the logic control module of the landing door fault location system can also be provided in the external panel of each floor of the elevator system, or a separate logic control board can also be provided for it. At this time, the logic control module can also communicate with the electrical level signal output port and/or the control port on the voltage signal processing unit in a wired or wireless manner. Similarly, a wireless communication module adapted to input and/or output communication data from the logic control module, such as a Bluetooth communication module, may also be provided in the external panel.

The landing door fault location system may also comprise a landing door fault display module provided in the external panel. The logic control module can send the landing door fault information to the corresponding landing door fault display module to display the fault.

A wireless communication module 132 is shown in FIG. 1. Through the wireless communication module 132, the communication between the voltage signal processing unit 120 on different floors, the elevator system control board 134, and special maintenance tools 133 such as mobile phone and diagnostic instrument can be realized. For example, information such as faults and displays output by the voltage signal processing unit 120 can be communicated to various floor panel and elevator system control boards through wireless communication, or related information can be accessed in a wireless manner through mobile terminals such as mobile phone APPs, special maintenance tools and so on. In this way, maintenance personnel can easily access and understand the related information by connecting to the wireless network.

The voltage signal processing unit 120 may be additionally provided with various interfaces for connecting to various peripheral devices. For example, the voltage signal processing unit 120 may be provided with a peripheral human-machine interface (for example, being connected to hall call button); an output display interface (for example, being connected to a peripheral device that outputs information about such as floor, direction, arrival lights, indicator lights, clock, etc.); and power source interface. With this arrangement, the voltage signal processing unit 120 is integrated with the external system, and various peripheral functions, such as hall call, display, etc., can be realized while realizing the door lock monitoring function.

Finally, a landing door fault location method carried out according to the landing door fault location system shown in FIG. 1 is described here. The method may comprise the following steps A1 to H1.

In step A1, set n=the total number of floors of elevator travel, and then proceed to step B1. In the elevator system, the landing door safety circuit is arranged from the top floor to the bottom floor from above to below. Therefore, the detection here also starts from the top floor and spreads down floor by floor. Then, proceed to step B1.

In step B1, the logic control module detects the first electrical level signal of the nth floor, if it is detected that the first electrical level signal of the nth floor is ON, then reports the normality of the landing door switch of the nth floor to the elevator system control board, and then proceed to step C1, if it is detected that the first electrical level signal of the nth floor is OFF, then reports the fault of the landing door switch of the nth floor to the elevator system control board and turns on the relay switches of all the floors where the fault has been determined, and then proceed to step C1. In this step, the first voltage signal collection circuit provides the electrical level signal to be detected, and the voltage signal bridge circuit realizes the bridge of the voltage signal from the upper floor to the next floor at the failed landing station.

In step C1, the first electrical level signal of the n−1th floor is detected, if it is detected that the first electrical level signal of the n−1th floor is ON, then reports the normality of the landing door switch of the n−1th floor to the elevator system control board, and then proceed to step F1, if it is detected that the first electrical level signal of the n−1th floor is OFF, then proceed to step D1. Here, when it is detected that the first electrical level signal of the n−1th floor is OFF, the status of the landing door switch of this floor cannot be determined. Therefore, it is necessary to determine whether a fault occurs at this floor by querying the voltage status of the upper floor of the system.

In step D1, the logic control module queries the elevator system control board whether there is a safety loop voltage signal at the nth floor. If yes, then reports the fault of the landing door switch of the n−1th floor to the elevator system control board, and then proceed to step E1, otherwise the event is saved and shut down the elevator. If there is a safety loop voltage signal at the nth floor, and if the first electrical level signal is OFF in the previous step, it means that there is a landing door switch fault at the n−1th floor. This judging method which only collects the first electrical level signal and is implemented by software reduces the use of electronic components and is beneficial to save system costs.

In step E1, the relay switches of all floors where the fault has been determined are turned on, and proceed to step F1. In this step, the bridge of the failed landing door switch assembly is realized, which is convenient to continue the fault detection of the next floor.

In step F1, it is judged whether n−1 is equal to 1, if yes, proceed to step H1, otherwise proceed to step G1. If n−1=1, it means that the first floor of the elevator system has been detected, and the detection of all landing stations has been completed, and the detection can be ended at this time.

In step G1, set n=n−1 and return to step C1. At this time, proceed to the fault detection of the landing door switch assembly of the next landing station.

In step H1, end. After the detection, the elevator system control board returns the elevator system to the normal status of the landing door fault detection, and waits for the maintenance personnel to deal with the located landing door fault.

FIG. 2 is a schematic diagram of a landing door fault location system according to another embodiment of the present invention. As mentioned earlier, this landing door fault location system is suitable for elevator systems. As can be seen from FIG. 2, the landing door fault location system 200 comprises a landing door safety circuit 210 and a voltage signal processing unit 220.

First, the following describes in detail the landing door safety circuit 210 shown in the figure.

In this embodiment, the landing door safety circuit 210 comprises multiple sets of landing door switch assemblies DSn.1 and DSn.2, DSn−1.1 and DSn−1.2 . . . DS1.1 and DS1.2 connected in series, for example, where DSn.1 and DSn.2 constitute a set of landing door switch assemblies; DSn−1.1 and DSn−1.2 constitute a set of landing door switch assemblies; . . . ; DS1.1 and DS1.2 constitute a set of landing door switch assemblies. Wherein, n represents the total number of floors in the elevator system, and "0.1" and "0.2" respectively represent the first switch and the second switch in each set of landing door switch assemblies. The first switch and the second switch in each set of landing door switches are also connected in series with each other.

Each set of landing door switch assemblies is set corresponding to a landing station of the elevator system. For example, the landing door switch assemblies DSn.1 and DSn.2 are set corresponding to the landing station of the nth floor of the elevator system; the landing door switch assemblies DSn–1.1 and DSn–1.2 are set corresponding to the landing station of the n–1th floor of the elevator system; . . . ; the landing door switch assemblies DS1.1 and DS1.2 are set corresponding to the landing station of the first floor of the elevator system.

In this example, the first switch may be a door close in place switch of the corresponding landing door, and the second switch may be a door lock in place switch of the corresponding landing door. If a certain landing door fails to close in place and/or the mechanical lock hook is not in place at a certain landing station, the door close in place switch and the door lock in place switch of the corresponding landing door will be turned off, and thus the entire landing door safety circuit will fail, the elevator system control board will control the elevator car to stop running according to the fault of the landing door safety circuit to avoid the elevator system running under unsafe conditions and at the same time issue maintenance requests. In alternative embodiments, according to the number of safety parameters involved in specific situations, the setting of other numbers and other types of landing door switch assemblies can also be considered, so as to be disconnected when different faults occur to the landing door, to realize the safety protection function.

As shown in the figure, each set of landing door switch assemblies DSn.1 and DSn.2, DSn–1.1 and DSn–1.2 . . . DS1.1 and DS1.2 are all connected in parallel with a voltage signal processing unit 220, and the first voltage signal input port 221 and the second voltage signal input port 222 of each voltage signal processing unit 220 are respectively electrically connected to the output end and the input end of the corresponding landing door switch assemblies.

Secondly, the voltage signal processing unit 220 in the figure is described in detail below. The voltage signal processing unit 220 may be a floor control board of an elevator system. In this example, it may be integrated with a landing door fault detection function.

As can be seen from the figure, each voltage signal processing unit 220 comprises a first voltage signal input port 221, a second voltage signal input port 222, a first electrical level signal output port 2231 and a second electrical level signal output port 2232. In the landing door fault location system, the first voltage signal input port 221 is connected to the output end of the landing door switch assembly of the corresponding landing station, and the second voltage signal input port 222 is connected to the input end of the landing door switch assembly of the corresponding landing door. By taking the output end and the input end of the corresponding landing door switch assembly as sampling points, the voltage signal processing unit 220 can collect the voltage signal from the output end and the input end of the landing door switch assembly, respectively.

Further, the voltage signal processing unit 220 further comprises a first voltage signal collection circuit between the first voltage signal input port 221 and the first electrical level signal output port 2231. The first voltage signal collection circuit terminates with the first voltage signal input port 221 and the first electrical level signal output port 2231, and the first voltage signal collection circuit is adapted to collect a first voltage signal received from the first voltage signal input port 221 as a first electrical level signal output from the first electrical level signal output port 2231.

The voltage signal processing unit 220 further comprises a second voltage signal collection circuit between the second voltage signal input port 222 and the second electrical level signal output port 2232. The second voltage signal collection circuit terminates with the second voltage signal input port 222 and the second electrical level signal output port 2232, and the second voltage signal collection circuit is adapted to collect a second voltage signal received from the second voltage signal input port 222 as a second electrical level signal output from the second electrical level signal output port 2232.

By detecting the first electrical level signal and the second electrical level signal, it can be used to judge whether there is a landing door fault at the corresponding landing station.

It can also be seen from FIG. 2 that the first voltage signal collection circuit comprises an optocoupler 2261. The optocoupler 2261 isolates the first voltage signal collection circuit into an input side circuit connecting the first voltage signal input port 221 and an output side circuit connecting the first electrical level signal output port 2231. It can be seen that the input side circuit and the output side circuit are isolated and interconnected by the optocoupler 2261 acting as an isolation device therebetween. Here, the optocoupler 2261 plays the role of photoelectric isolation, and can be triggered by the voltage signal in the input side circuit (analog circuit) to make the output side circuit (digital circuit) output a first electrical level signal (high electrical level signal or low electrical level signal). When the input side circuit collects the voltage signal from the first voltage signal input port 221, the light emitter of the optocoupler 2261 emits light, and the light receiver receives the control of light to turn on the output side circuit, thereby outputting the first electrical level signal through the first electrical level signal output port 2231.

It can also be seen from FIG. 2 that the second voltage signal collection circuit comprises an optocoupler 2262. The optocoupler 2261 isolates the second voltage signal collection circuit into an input side circuit connecting the second voltage signal input port 222 and an output side circuit connecting the second electrical level signal output port 2232. It can be seen that the input side circuit and the output side circuit are isolated and interconnected by the optocoupler 2262 acting as an isolation device therebetween. Here, the optocoupler 2262 plays the role of photoelectric isolation, and can be triggered by the voltage signal in the input side circuit (analog circuit) to make the output side circuit (digital circuit) output a second electrical level signal (high electrical level signal or low electrical level signal). When the input side circuit collects the voltage signal from the second voltage signal input port 222, the light emitter of the optocoupler 2262 emits light, and the light receiver receives the control of the of light to turn on the output side circuit, thereby outputting the second electrical level signal through the second electrical level signal output port 2232.

Compared with the landing door fault location system in FIG. 1, it can be seen that the landing door fault location system in FIG. 2 is added with hardware components related to the second voltage signal collection circuit.

In this embodiment, the input side circuit of the first voltage signal collection circuit further comprises a divider resistor 2271 and a rectifier bridge 2281 connected in series. The function of the divider resistor 2271 is to take up a part of or most of the voltage to avoid excessive voltage being distributed to the optocoupler and exceeding its working limit and causing damage. The function of the rectifier bridge 2281 is that one end thereof collects signals and another end is grounded, and its function is to convert AC to DC and then pass it to the light source control end of the light emitter of the optocoupler 2261.

In this embodiment, similarly, the input side circuit of the second voltage signal collection circuit further comprises a divider resistor 2272 and a rectifier bridge 2282 connected in series. The function of the divider resistor 2272 is to take up a part of or most of the voltage to avoid excessive voltage being distributed to the optocoupler and exceeding its working limit and causing damage. The function of the rectifier bridge 2282 is that one end thereof collects signals and another end is grounded, and its function is to convert AC to DC and then pass it to the light emitter of the optocoupler 2262.

In an optional embodiment, a relay may be used instead of the optocouplers 2261, 2262 as the isolation device. At this time, the rectifier bridge converts AC to DC, and then passes it to the coil end of the relay. When the input side circuits of the first and second voltage signal collection circuits collect the voltage signal from the first and second voltage signal input port, the relay coil is energized, and the normally open contact of the relay is closed to turn on the first and second electrical level signal generating circuits. The high electrical level or low electrical level signal obtained from the input side circuit of the first and second voltage signal collection circuits can be input to the I/O port of the logic controller.

Still further, the voltage signal processing unit 220 further comprises a voltage signal bridge circuit between the first voltage signal input port 221 and the second voltage signal input port 222. The voltage signal bridge circuit terminates with a first voltage signal input port 221 and a second voltage signal input port 222, and a normally open relay switch 224 is provided between the first voltage signal input port 221 and the second voltage signal input port 222. The function of the relay switch 224 here is to close the relay switch 224 in the voltage signal bridge circuit of the voltage signal processing unit 220 at the corresponding landing station when there is a landing door fault in the corresponding landing station, enabling the voltage signal of the landing door safety circuit to transmit to the landing door switch assembly and the voltage signal processing unit at the next landing station to facilitate the detection of the landing door fault at the next landing station. It can be understood that when there is a landing door fault at a certain landing station, the switch in the landing door switch assembly will be disconnected, which will cause the landing door safety circuit to be disconnected at that floor; at this time, the voltage signal bridge circuit will bridge the voltage signal of the last floor to the next floor.

In the illustrated embodiment, for the sake of safety and reliability, in order to prevent accidental closing of the relay switch, the number of the relay switch 224 is two, and they are connected in series with each other. Accidental risks can be prevented from occurring by independently controlling the opening and closing of the two relay switches 224 through two lines. In an optional embodiment, the number of relay switches can also be set to only one or be set to more. These larger numbers of relay switches are also adapted for series connection with each other.

As shown in the figure, the voltage signal processing unit 220 is also provided with a control port 230 for controlling the relay switch. The number of the control ports 230 can be the same as the number of the relay switches 224, and the corresponding relay switches 224 are independently controlled through each control port respectively.

In addition, it can also be seen from the figure that a current limiting resistor 225 connected in series with the relay switch 224 is provided in the voltage signal bridge circuit, and the current limiting resistor 225 is located upstream of the relay switch 224. The upstream is close to the input end of the landing door switch assembly, that is, the voltage signal from the upper floor will pass through the current limiting resistor 225 before reaching the relay switch 224. In other embodiments, according to specific situations, the current limiting resistor may also be provided downstream of the relay switch. The function of the current limiting resistor 225 is to perform current limiting processing on the voltage signal bridge circuit, so that although the voltage at both ends of the circuit is basically unchanged, there is basically no power output. Therefore, the limited current cannot drive the primary contactor coil of the elevator control system to close, thereby preventing accidental startup of the elevator, but can realize the bridging of the voltage signal to continue the landing door fault detection.

Further, in an optional embodiment, a fuse connected in series with the current limiting resistor 225 may be provided in the voltage signal bridge circuit. The fuse may be located upstream of the current limiting resistor 225. In other embodiments, according to specific situations, the fuse can also be provided downstream of the current limiting resistor. When the current limiting resistor 225 is short-circuited, the fuse melts and self-cuts the circuit, which can protect the circuit and prevent the landing door safety circuit from being accidentally bridged.

In the embodiment of FIG. 2, a power source interface (not shown) may also be provided for supplying power to the voltage signal processing unit.

In addition, in an optional embodiment, the voltage signal processing unit may further comprise a logic control module (not shown). In this case, the first electrical level signal output port, the second electrical level signal output port on the corresponding voltage signal processing unit and/or the control port for controlling the relay switch, etc., can communicate with the logic control module in a wired or wireless manner. During wireless communication, the voltage signal processing unit may be provided with a wireless communication module adapted to input and/or output communication data from the logic control module, such as a Bluetooth communication module.

It can be understood that, in an alternative embodiment, the logic control module of the landing door fault location system can also be provided in the external panel of each floor of the elevator system, or a separate logic control board can also be provided for the external panel of each floor of the elevator system. At this time, the logic control module can also communicate with the electrical level signal output port and/or the control port on the voltage signal processing unit in a wired or wireless manner. Similarly, a wireless communication module adapted to input and/or output communication data from the logic control module, such as a Bluetooth communication module, may also be provided in the external panel.

The landing door fault location system may also comprise a landing door fault display module provided in the external panel. The logic control module can send the landing door fault information to the corresponding landing door fault display module to display the fault.

A wireless communication module 232 is shown in FIG. 2. Through the wireless communication module 232, communication between the voltage signal processing unit 220 on different floors, the elevator system control board 234, and special maintenance tools 233 such as mobile phone and diagnostic instrument can be realized. For example, information such as faults and displays output by the voltage signal processing unit 220 can be communicated to the control board at various floors and elevator system control boards through wireless communication, or related information can be accessed in a wireless manner through mobile terminals such as mobile phone APPs, special maintenance tools and so on. In this way, maintenance personnel can easily access and understand related information by connecting to the wireless network.

The voltage signal processing unit 220 may be additionally provided with various interfaces for connecting to various peripheral devices. For example, the voltage signal processing unit 220 may be provided with a peripheral human-machine interface (for example, connected to a hall call button); an output display interface (for example, connected to a peripheral device that outputs information such as floor, direction, arrival lights, indicator lights, clock, etc.); and power source interface. With this arrangement, the voltage signal processing unit 220 is integrated with the external system, and various peripheral functions, such as hall call, display, etc., can be realized while realizing the door lock monitoring function.

Finally, a landing door fault location method carried out according to the landing door fault location system shown in FIG. 2 is described here. The method may comprise the following steps A2 to F2.

In step A2, set n=the total number of floors of elevator travel, and then proceed to step B2. In the elevator system, the landing door safety circuit is arranged from the top floor to the bottom floor from above to below. Therefore, the detection here also starts from the top floor and spreads down floor by floor. Then, proceed to step B2.

In step B2, the logic control module detects the first electrical level signal and the second electrical level signal of the nth floor, if it is detected that the first electrical level signal of the nth floor is ON and the second electrical level signal of the nth floor is ON, then reports the normality of the landing door switch of the nth floor to the elevator system control board, and then proceed to step D2, if it is detected that the first electrical level signal of the nth floor is OFF and the second electrical level signal of the nth floor is ON, then reports the fault of the landing door switch of the nth floor to the elevator system control board and turns on the relay switches of all the floors where the fault has been determined, and then proceed to step C2. In this step, the first voltage signal collection circuit provides the first electrical level signal to be detected, the second voltage signal collection circuit provides the second electrical level signal to be detected, and the voltage signal bridge circuit realizes the bridge of the voltage signal at the failed landing station from the upper floor to the next floor. Here, the landing door fault is judged by acquiring both the first electrical level signal and the second electrical level signal.

In step C2, turn on the relay switches of all floors where the fault has been determined, and proceed to step D2. In this step, the bridge of the failed landing door switch assembly is realized, which is convenient to continue the fault detection of the next floor.

In step D2, it is judged whether n is equal to 1, if yes, proceed to step F2, otherwise proceed to step E2. If n=1, it means that the first floor of the elevator system has been detected, and the detection of all landing stations has been completed, and the detection can be ended at this time.

In step E2, set n=n−1 and return to step B2. At this time, proceed to the fault detection of the landing door switch assembly of the next landing station.

In step F2, end. After the detection, the elevator system control board returns the elevator system to the normal status of the landing door fault detection, and waits for the maintenance personnel to deal with the located landing door fault.

Based on the above, this specification describes in detail in combination with the landing door fault location system in FIG. 1 and FIG. 2; at the same time, in combination with the above description, this specification also describes the voltage signal processing unit in the landing door fault location system, the elevator system including the landing door fault location system, the method for using the landing door fault system to locate the landing door fault, and their appropriate transformations. The beneficial technical effects that can be achieved by these technical solutions can comprise one or more of the following technical effects: low-cost realization of landing door fault location; effective realization of landing door fault location; being convenient for maintenance personnel to quickly and remotely obtain landing door fault information; high safety and reliability and being able to meet the requirements of relevant safety standards for elevator systems; good compatibility with existing elevator systems, and being easy to retrofit existing elevator systems.

The technical scope of the present invention is not limited to the content in the above description. Those skilled in the art can make various transformations and combinations of the above embodiments without departing from the technical spirits of the present invention, and these transformations, and combinations should all fall within the scope of the present invention.

What is claimed is:

1. A voltage signal processing unit, characterized in that, the voltage signal processing unit comprises:
  a first voltage signal input port;
  a second voltage signal input port;
  a first electrical level signal output port;
  a first voltage signal collection circuit, the first voltage signal collection circuit terminates with the first voltage signal input port and the first electrical level signal output port, the first voltage signal collection circuit is adapted to collect a first voltage signal received from the first voltage signal input port as a first electrical level signal and output the first electrical level signal to the first electrical level signal output port; and
  a voltage signal bridge circuit, the voltage signal bridge circuit terminates with the first voltage signal input port and the second voltage signal input port, a normally open relay switch is provided between the first voltage signal input port and the second voltage signal input port;
  wherein the number of the relay switch is more than one, and each relay switch is connected in series.

2. The voltage signal processing unit according to claim 1, wherein a current limiting resistor connected in series with the relay switch is provided in the voltage signal bridge circuit.

3. The voltage signal processing unit according to claim 2, wherein a fuse connected in series with the current limiting resistor is provided in the voltage signal bridge circuit.

4. The voltage signal processing unit according to claim 1, wherein the voltage signal processing unit is further provided with a control port for independently controlling each of the relay switches.

5. The voltage signal processing unit according to claim 1, wherein the first voltage signal collection circuit comprises a first isolation device, the first isolation device isolates the first voltage signal collection circuit into an input side circuit connecting the first voltage signal input port and an output side circuit connecting the first electrical level signal output port.

6. The voltage signal processing unit according to claim 5, wherein the input side circuit comprises a divider resistor and a rectifier bridge connected in series, the rectifier bridge is connected to the first isolation device.

7. The voltage signal processing unit according to claim 1, wherein the voltage signal processing unit further comprises:

a second electrical level signal output port; and a second voltage signal collection circuit, the second voltage signal collection circuit connects the second voltage signal input port and the second electrical level signal output port, the second voltage signal collection circuit is adapted to collect a second voltage signal received from the second voltage signal input port as a second electrical level signal output from the second electrical level signal output port.

8. The voltage signal processing unit according to claim 7, wherein the second voltage signal collection circuit comprises a second isolation device, the second isolation device isolates the second voltage signal collection circuit into an input side circuit connecting the second voltage signal input port and an output side circuit connecting the second electrical level signal output port.

9. The voltage signal processing unit according to claim 8, wherein the input side circuit comprises a divider resistor and a rectifier bridge connected in series, the rectifier bridge is connected to the second isolation device.

10. The voltage signal processing unit according to claim 1, wherein the voltage signal processing unit is provided with a power source interface, and also provided with a peripheral human-machine interface and/or an output display interface.

11. The voltage signal processing unit according to claim 1, wherein the voltage signal processing unit further comprises a logic control module, and the electrical level signal output port on the voltage signal processing unit and/or the control port communicates with the logic control module in a wired or wireless manner.

12. The voltage signal processing unit according to claim 11, wherein the voltage signal processing unit is further provided with a wireless communication module adapted to input and/or output communication data from the logic control module.

13. A landing door fault location system for an elevator system, characterized in that, the landing door fault location system comprises a landing door safety circuit, the landing door safety circuit comprises multiple sets of landing door switch assemblies connected in series, and each set of the landing door switch assemblies is set corresponding to a landing station of the elevator system, wherein, each set of the landing door switch assemblies is connected in parallel with the voltage signal processing unit according to claim 1, and the first voltage signal input port and the second voltage signal input port of the voltage signal processing unit electrically connect an output end and an input end of the corresponding landing door switch assembly respectively.

14. The landing door fault location system according to claim 13, wherein the landing door switch assembly comprises a door close in place switch and a door lock in place switch connected in series, and the door close in place switch and the door lock in place switch is a normally closed switch.

15. The landing door fault location system according to claim 13, wherein the landing door fault location system comprises a logic control module located in an external panel of each floor of the elevator system, and the electrical level signal output port on the voltage signal processing unit and/or the control port communicates with the logic control module in a wired or wireless manner.

16. The landing door fault location system according to claim 15, wherein the external panel is further provided with a wireless communication module adapted to input and/or output communication data from the logic control module.

17. A landing door fault location method using the landing door fault system according to claim 13.

18. The landing door fault location method according to claim 17, wherein the landing door switch assembly is connected in parallel to the voltage signal processing unit, the method comprises following steps:

step A1: set n=the total number of floors of elevator travel, and then proceed to step B1;

step B1: the logic control module detects the first electrical level signal of the nth floor, if it is detected that the first electrical level signal of the nth floor is ON, then reports the normality of the landing door switch of the nth floor to an elevator system control board, and then proceed to step C1, if it is detected that the first electrical level signal of the nth floor is OFF, then reports the fault of the landing door switch of the nth floor to the elevator system control board and turns on the relay switches of all the floors where the fault has been determined, and then proceed to step C1;

step C1: detect the first electrical level signal of the n−1th floor, if it is detected that the first electrical level signal of the n−1th floor is ON, then reports the normality of the landing door switch of the n−1th floor to the elevator system control board, and then proceed to step F1, if it is detected that the first electrical level signal of the n−1th floor is OFF, then proceed to step D1;

step D1: the logic control module queries from the elevator system control board whether there is a safety loop voltage signal at the nth floor, If yes, then reports the fault of the landing door switch of the n−1th floor to the elevator system control board, and then proceed to step E1, otherwise the event is stored and the elevator is shut down;

step E1: turn on the relay switches of all floors where the fault has been determined, and proceed to step F1;

step F1: judge whether n−1 is equal to 1, if yes, then proceed to step H1, otherwise proceed to step G1;

step G1: set n=n−1 and return to step C1;

step H1: end.

19. The landing door fault location method according to claim 17, wherein the landing door switch assembly is connected in parallel to the voltage signal processing unit, the method comprises following steps:

step A2: set n=the total number of floors of elevator travel, and then proceed to step B2;

step B2: the logic control module detects the first electrical level signal and the second electrical level signal of the nth floor, if it is detected that the first electrical level signal of the nth floor is ON and the second electrical level signal of the nth floor is ON, then reports the normality of the landing door switch of the nth floor to an elevator system control board, and then proceed to step D2, if it is detected that the first electrical level signal of the nth floor is OFF and the second electrical level signal of the nth floor is ON, then reports the fault of the landing door switch of the nth floor to the elevator system control board and turns on the relay switches of all the floors where the fault has been determined, and then proceed to step C2;

step C2: turn on the relay switches of all floors where the fault has been determined, and proceed to step D2;

step D2: judge whether n is equal to 1, if yes, then proceed to step F2, otherwise proceed to step E2;

step E2: set n=n−1 and return to step B2;

step F2: end.

20. An elevator system, characterized in that, the elevator system comprises the voltage signal processing unit according to claim 1.

\* \* \* \* \*